Nov. 16, 1943.     M. F. LEMROW     2,334,497
FAVOR CAKE
Filed June 9, 1941
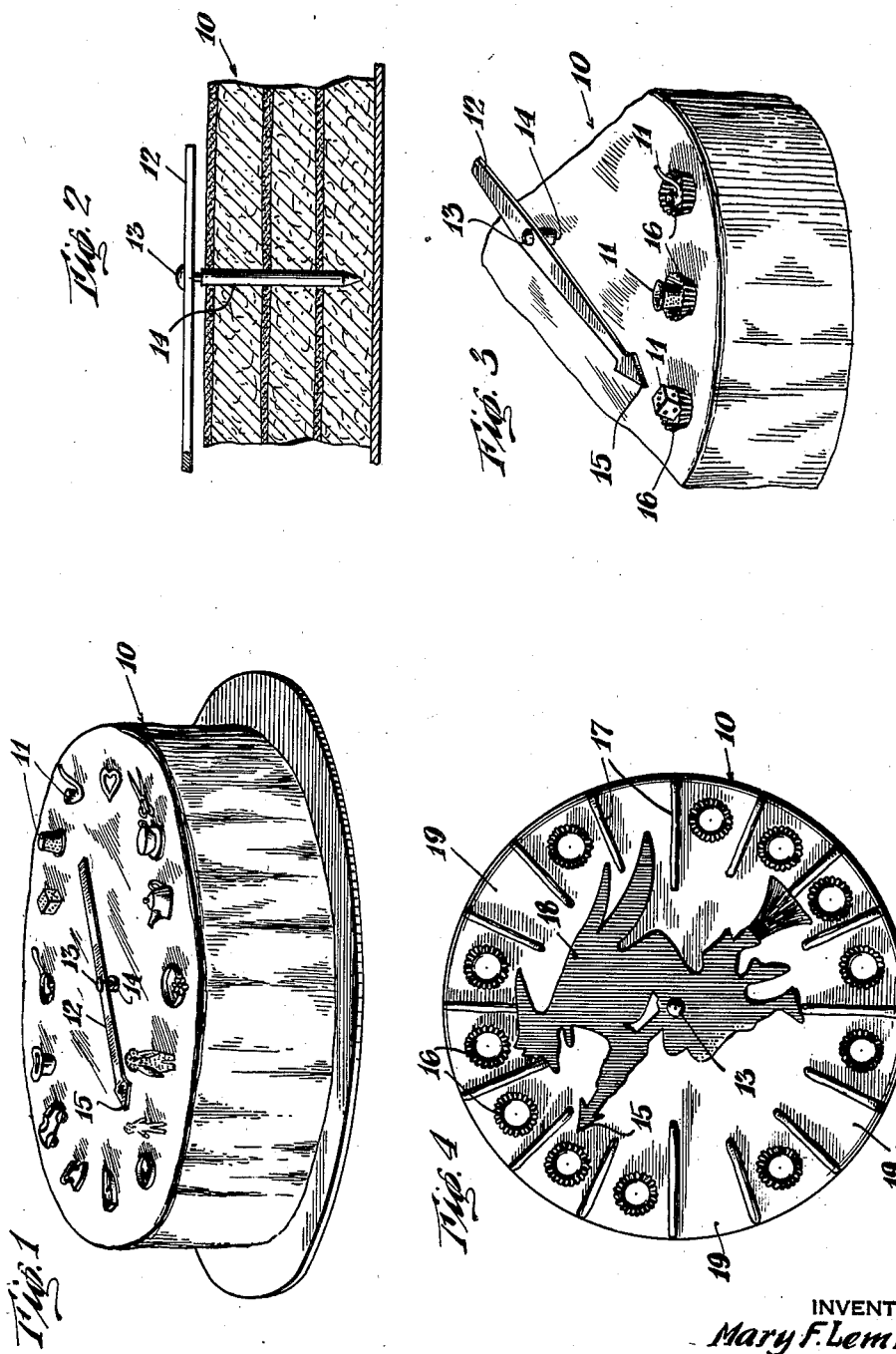
INVENTOR
Mary F. Lemrow
BY
Cooper, Kent + Dunham
ATTORNEYS Patented Nov. 16, 1943

2,334,497

UNITED STATES PATENT OFFICE 2,334,497

FAVOR CAKE

Mary F. Lemrow, New York, N. Y., assignor to Cushman's Sons, Inc., New York, N. Y., a corporation of New York Application June 9, 1941, Serial No. 397,180

4 Claims. (Cl. 273—141)

This invention relates to a favor or novelty cake and has for a primary object the provision of a new and attractive bakery product, i. e., a cake having an improved arrangement for carrying and dispensing small favors, souvenirs or the like, and thus specially adapted to be used at parties, special occasions and the like.

It has long been the practice, in making cakes for special occasions, to embed and conceal within the cake various articles or souvenirs, such as rings or other small metal or wooden objects. The custom has been to place such articles in the dough or batter before the cake is baked, so that when the latter is finished, the objects are entirely concealed and each remains as a surprise and favor for the person who happens to receive the slice of cake which contains it. Objection has been found in this practice, particularly in that it permits metal or other contaminating materials to come into contact with the moist dough or batter before and during the baking operation, the chief hazard being considered to be the possibility of poisoning or other harmful effect by reason of action between the embedded article and the moist dough. Furthermore, there is the danger that the person, such as a small child, who eats the cake, might be hurst by biting inadvertently on the embedded object, or might accidently swallow the object. Indeed, for one or another of these reasons, the matter has been one of public health regulation, and at least in certain localities, the authorities have forbidden the sale of cakes with any hard, foreign or otherwise inedible object or material incorporated therein. One proposal for obviating the difficulty has been to bake the cake in the ordinary way and then insert the favors or souvenirs by cutting into the underside of the cake and pushing the objects into the resulting holes or incisions. This practice, however, does not overcome all of the difficulties and it furthermore involves a messy and inconvenient operation and usually results in damage or destruction of the iced and decorated upper surface of the cake.

Accordingly, an important object of the present invention is to provide favors of the character described for a cake but without baking or otherwise embedding them inside the cake, and at the same time to afford, in substantial measure, the element of surprise and chance hitherto achieved in the prior structures hereinabove described. To these and other ends, such as will be hereinafter apparent or are incidental to the practice of the invention, important features of my improved favor cake include the disposition about or around the upper surface of the finished and decorated cake, of a plurality of small favors or souvenirs, and the provision, conveniently at the center of the upper cake surface, of a mechanical spinner or selecting device, which can be operated so as to determine by chance both the portion of the cake to be received by a given person, and the particular favor to accompany it. The selecting device may itself be in such form as to cooperate in the adornment of the cake, and the upper surface of the cake may be provided with radial lines or strips of different colored icing, or candy, or other markings, to delineate the section of the cake at which the selecting device comes to rest. In practice, I also prefer to mount the favors in small decorative cups or the like, for the mutual protection of the favor and the adjoining edible portion of the product.

Certain presently preferred forms of the invention are illustrated, by way of example, in the accompanying drawing wherein:

Figure 1 is a perspective view of a completed cake embodying my invention;

Fig. 2 is a fragmentary vertical section showing an advantageous mechanical arrangement of selecting device;

Fig. 3 is a fragmentary perspective view showing a preferred arrangement for disposition of the favors; and Fig. 4 is a plan view of a somewhat modified structure of cake.

Referring to Fig. 1, a cake generally designated 10 may be baked and iced or otherwise decorated in the usual manner. After the cake is made and the icing or other edible decoration completed thereon, the desired favors or souvenirs 11 are disposed in an annular row around the outside of the upper surface of the cake, as shown. These may, for example, be any small objects having decorative or amusing character, such as rings, safety pins, miniature hats, shoes, ships, automobiles or the like, and they may be made of metal, wood, plastic or other appropriate material. At the center of the cake there is disposed a selecting device, which may conveniently comprise a balanced, horizontally disposed pointer 12, pivoted at its center by means of a pin 13 to a suitable post or rod 14 which is pressed down into the cake in a vertical position, as more fully shown in Fig. 2. Although in some cases the pointer 12, pin or stud 13 and supporting rod 14 may be made of metal, wood or the like, it is desirable to make these parts (or at least the rod 14) of a smooth plastic material, as of types of such material now commonly available, which may have decorative color and which are harmless and inert to the cake.

It will now be seen that when the cake is to be served, the pointer 12 is simply started spinning by hand, and thereupon its point 15 will eventually come to rest near one or the other of the favors 11—thus indicating the portion of cake and the accompanying favor to be received by the person for whom (or if desired, by whom) the spinner is operated. This process may be repeated for each serving of the cake and it will now be readily seen that the structure provides a full measure of suspense, fun, and excitement, particularly for children's parties and like occasions. The article lends itself to a variety of modes of operation; for example, one person may operate the selecting device for all servings, or it may be operated by each guest in turn. Furthermore, if the apparatus is used for all servings of the cake, the matter of suspense and excitement increases as the dispensing operation proceeds, since the removal of more and more slices will provide an increased number of blanks, so to speak, and tend to require an entertainingly increased number of spins for success in each succeeding serving operation.

Although in Fig. 1, the small favors are shown simply as placed upon or slightly embedded in the upper surface of the cake, Fig. 3 illustrates a preferred arrangement, wherein each of the articles 11 is disposed in a small receptacle 16, conveniently comprising a shallow paper cup having crimped or corrugated sides. In this manner, the favors or souvenirs 11, which are usually of metal, are prevented from coming in contact with the edible portion of the cake, and the icing and like parts of the cake are thus protected; and at the same time, the favors themselves are kept clean and ready for convenient examination and play.

Fig. 4 illustrates another form of the invention, wherein for convenience in determining the position at which the spinner has come to rest, the upper surface of the cake is radially marked, e. g., to provide a separate segment for each favor and its accompanying receptacle 16. Although the markings may be of various characters, they are shown as comprising radial strips 17 of icing or candy colored differently from that of the remainder of the upper iced surface of the cake. A further feature of the invention is that the selecting device or spinner may itself have a special decorative character. Thus in Fig. 4, the pointer member comprises a flat figure 18 of heavy cardboard, plastic sheet or the like, which may be represented as holding or embodying the desired pointer 15. Thus the figure may represent a witch, as shown, for the occasion of Halloween, or the spinner may represent any of a variety of figures or articles appropriate to holidays, birthdays or other special occasions.

It will be appreciated that, in some cases, the favors need not be disposed in an even manner all around the cake. For example, as in Fig. 4 there may be left some "blank" segments 19, thus adding to the amusement and suspense in operating and serving the product.

In the commercial manufacture and sale of the invention, the cake may be sold with the various favors already applied and with the spinner inserted (after completion of baking and icing); or the several articles, including the spinner, may be embodied in a separate package sold with the cake, for application by the purchaser when the cake is to be served. It will be understood that the supporting post or rod 14 of the spinner is conveniently of such thinness that it may be readily pressed down into the cake from the upper surface, and will remain therein by the natural resilience and adhesiveness of the cake, during a plurality of spinning operations.

It will now be seen that the apparatus provides an extremely attractive product, particularly to be served at children's parties or the like, and affords to the guests not only the pleasure of receiving souvenirs or favors, and the fun of operating the spinner and of watching its operation, but also a great deal of suspense and amusing uncertainty in that no one knows which favor and section of cake he is to receive, until the laws of chance have functioned in the operation of the selecting device. At the same time, there is avoided any undesirable effect of baking articles within the cake, or any of the unpleasant hazards of concealing such things in the product. Moreover, the structure is peculiarly adapted for decorating and embellishing the cake, in that the selecting device, the articles and likewise their containers, may be of a variety of forms, shapes and colors to cooperate in suiting any desired occasion or decorative scheme.

It will be understood that the invention is not limited to the specific structures herein shown or described, but may be embodied in other forms without departure from its spirit, as defined by the following claims.

I claim:

1. A favor cake comprising, in combination, a finished food cake, a plurality of small favors supported by and disposed about the exterior surface of the cake in circumferentially spaced relation, a selecting device mounted on the cake and operable to indicate by chance, a specific favor and corresponding cake portion, and means inert to the cake for mounting said selecting device on the cake without contaminating it.

2. The combination, with a food cake, of a plurality of articles to constitute favors, disposed about the exterior of the cake, and a selecting device comprising supporting means engaging the cake and indicating means freely pivoted to said supporting means and arranged to be rotated past the aforesaid articles for indicating corresponding portions of the cake, and adapted to come to rest, by chance, adjacent any one of said articles, said supporting means having the portion thereof engaging the cake made of material inert to the cake.

3. The combination, with a food cake, of a plurality of containers disposed about and supported by the exterior surface of the cake, said containers being each adapted to hold a small article and prevent contaminating contact between the article and the cake, a selecting device including a movable element adapted to move past said containers in succession, and adapted to indicate corresponding portions of the cake, and adapted to come to rest, by chance, adjacent any one of said containers, and means having a portion thereof inert to the cake and in contact therewith for supporting said selecting device.

4. A favor cake comprising, in combination, a finished cake, a plurality of mutually differing articles supported by and disposed about the upper surface of the cake in circumferentially spaced relation, and a selecting device comprising a pointer member and means engaging the cake, for pivotally suporting the pointer member for free horizontal rotation of the member about a point substantially central of the upper surface of the cake, said cake-engaging means having a rod contacting with the interior of the cake and which is formed of a material inert to the cake to avoid contamination.

MARY F. LEMROW.